May 4, 1948.  B. STOUDT  2,441,043
SPOT WELDING MACHINE
Filed May 18, 1945  2 Sheets-Sheet 2
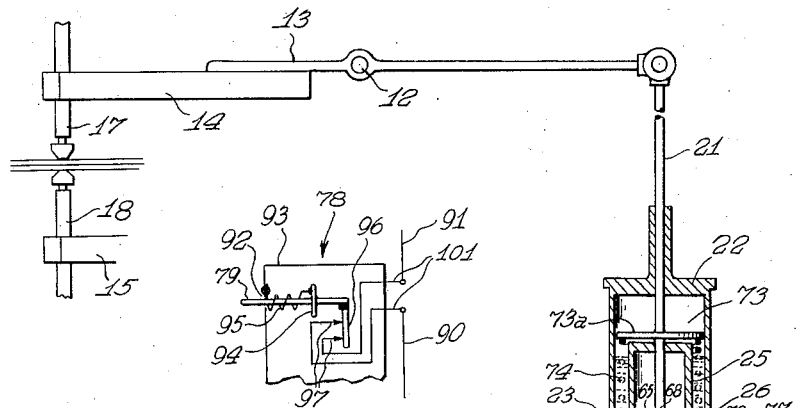
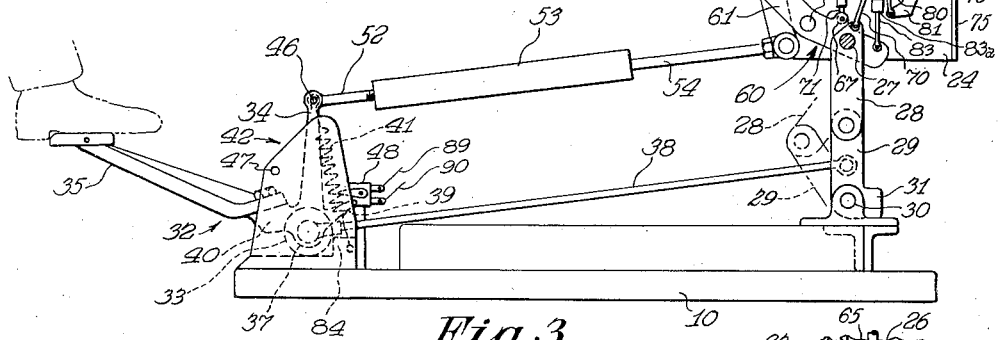
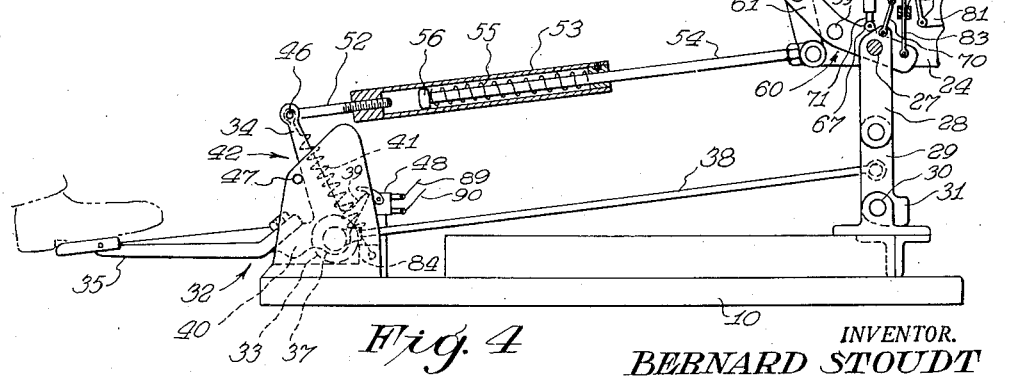
INVENTOR.
BERNARD STOUDT
BY J. Ledermann
ATTORNEY Patented May 4, 1948

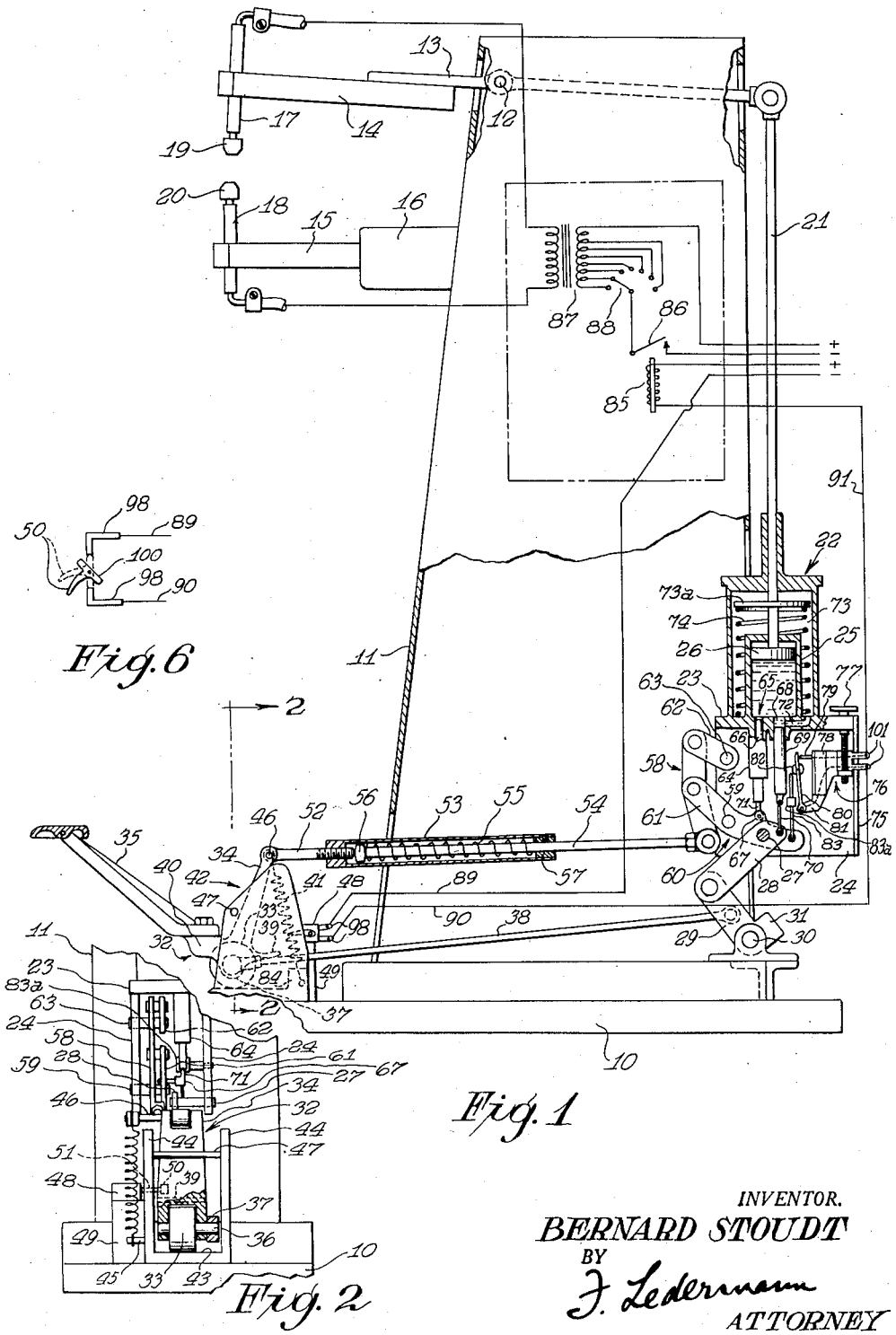

2,441,043

UNITED STATES PATENT OFFICE 2,441,043

SPOT-WELDING MACHINE

Bernard Stoudt, Valley Stream, N. Y., assignor to Ames Spot Welder Co., Inc., Brooklyn, N. Y., a corporation of New York Application May 18, 1945, Serial No. 594,535

3 Claims. (Cl. 219—4)

This invention relates to spot welding apparatus or machines, and aims to provide a novel construction and arrangement of parts whereby a close and accurate control of the welding tips is automatically and continuously had regardless of voltage fluctuations, resistance variations or welding tip irregularities, thereby assuring perfect welds.

A further object of the invention is the provision of a device to bring together the welding points of a spot welder regardless of the spacing of the points or of the gage of the metal to be welded, within the range of the welder to which the device is applied, and to automatically control the welding of the metal with great accuracy by gaging the impressions.

Another object is the provision of an auxiliary or secondary device constituting part of the above-mentioned device, together known as a gagetimer, to apply pressure on the welder points, and having means for applying high pressure to the points through a control means having very minute variations of applied pressure.

Other objects are, the provision of a gagetimer to control the depth of the impressions formed by pressure upon the work due to the softening and fusing of the work when conducting a large current; to provide a gagetimer which is adjustable, to accurately control the impressions and duplicate to a very fine degree, such as, for instance, one-thousandth of an inch; to provide a gagetimer which is adjustable for pressure, that is, low for light gages, higher for heavy gages; to provide a gagetimer which is adjustable for indentation and which automatically compensates for variations in resistance, voltage fluctuations, electrode wear and gage irregularities, and which will duplicate consistently the impressions for which the gagetimer has been adjusted.

The invention permits variation, by the operator, of the depth of the impression to any degree within the range of the gagetimer, and the impression can be consistently duplicated without further attention regardless of voltage fluctuation, electrode wear, or other irregular occurrence so troublesome with conventional spot welding apparatus. The gagetimer, properly applied to a spot welder, will produce uniform welds under adverse conditions.

The above and other objects will become apparent in the description below, wherein characters of reference refer to like-numbered parts in the accompanying drawings. It is to be understood that the drawings are intended for the purpose of illustration only, and that it is neither desired nor intended to limit the invention in any manner to the specific details of construction shown excepting insofar as they may be deemed essential to the invention.

Referring briefly to the drawings, Fig. 1 is a side elevational view of a spot welder machine having the gagetimer applied thereto, with parts broken away and partly in section, and including a wiring diagram.

Fig. 2 is a cross-sectional view taken on the line 2—2 of Fig. 1.

Fig. 3 is a view similar to Fig. 1, with the machine housing omitted, showing the positions of the various parts of the mechanism with the treadle partly depressed.

Fig. 4 is a partial view similar to Fig. 3, showing the treadle fully depressed and also showing the adjustable control switch of the primary circuit is opened condition as a result of an increase in depth of the impression, as will be clarified below.

Fig. 5 is an enlarged schematic view of one of the two switches in the primary or relay circuit.

Fig. 6 is a similar view of the other of the said two switches.

Referring in detail to the drawings, the numeral 10 indicates a base having a hollow casing or housing 11 supported thereon. On a transverse pivot 12 near the top of the housing, a lever 13 is fulcrumed and extends through both the front and rear walls of the housing. An electrode holder 14 is secured to its forward end, and a stationary electrode holder 15 extends from a support 16 rigid with the housing, the electrodes being shown at 17 and 18 having the welding points 19 and 20. A substantially vertical rod 21 is pivotally suspended from the rear end of the lever 13 and passes slidably through a cylinder 22. The lower end of the cylinder 22 is closed by a plate 23 integral therewith from opposite sides of which spaced walls 24 extend downward. Within the cylinder 22 a second smaller coaxial cylinder, or barrel, 25 is mounted on the plate 23 with the latter also sealing the open or lower end of the barrel 25. The rod 21 also passes slidably through the barrel 25 and terminates in a piston 26 therein.

On a horizontal pivot 27, extending from the right-hand wall 24 (Fig. 2), one end of a link 28 is pivoted; the other end of this link is pivoted to a link 29 which in turn is pivoted at 30 to the base 10 and is provided with a limit stop ear 31.

A bell crank 32 is mounted upright at the front of the base 10 and has a roller 33 pivotally mounted at the intersection of its shorter arm 40 and its longer arm 34. A treadle 35 is secured to the arm 33, and the extension of one side of the roller shaft 36 is engaged by a ring 37 on the end of a rod 38 whose other end is pivoted intermediate the length of the link 29. An upwardly tilting nose 39 is formed on the bell crank arm 34. A spring 41 anchored near the rear of the floor of the treadle support and guide member 42 on a pin 45 and secured to a pin 46 in the upper end of the arm 34, normally urges the bell crank toward clockwise rotation to the limit point determined by the means to be described.

The treadle guide member 42 comprises the floor 43 and the two spaced upright walls 44, and has a limit stop rod 47 supported between its walls to limit the forward movement of the crank arm 34. Adjacent one wall 44, and at the rear thereof, a toggle switch 48 is supported on an upright 49 and has its lever 50 on the end of a pin 51. One end of a rod whose other end is threaded, 52, is pivoted to the pin 46 and thus to the free end of the crank arm 34. The threaded end of this rod engages one end of a sleeve 53 in which a rod 54 is slidably mounted; a coiled spring 55 surrounding the rod 54 between its head 56 and the reduced end 57 of the sleeve, normally urges the rod 54 against the rod 52. The outer extremity of the rod 54 is pivoted to the lower end of a deformed link 58.

A second deformed link 60 is pivoted intermediate its length on a horizontal pivot 59 supported in the left-hand wall 24 (Fig. 2). One end 61 of the link 60 is pivoted intermediate the deformed link 58. A short link 62 has one end pivoted at 63 to the left-hand wall 24, Fig. 2.

A small vertical sleeve or cylinder 64 is formed in the fashion of a nipple about an opening 65 passing through the plate 23 within the barrel 25, and a plunger 66 is slidable therein with its upper end terminating between the upper and lower ends of the said opening. The lower end of the plunger 66 is pivoted to an ear 67 on the link 60 through the medium of a flexible rod 71. A second opening 68 extends through the plate 23 within the barrel 25 and has a valve stem 69 slidable therein, whose lower end is pivoted to the upper extremity of the line 28 through the medium of a flexible rod 70. A by-pass 72 provides communication between the chamber 73 and the barrel 25, which is adapted to be cut off by the stem 69 when the latter is in raised position, as is obvious. A collar 73a on the rod 21 provides the upper stop for a coiled spring 74 surrounding the barrel 25, the lower end of the spring resting on the plate 23. A volume of fluid, such as oil, approximately equal to the volume of the barrel 25, is provided within the cylinder 22 to function in the manner to be described below.

A vertical bar 75 extends downward from an extension of the plate 23 and has frictionally slidable thereon a carriage 76 which is adapted to be raised or lowered by a screw 77. The carriage carries a switch 78 having a spring-expelled push pin 79 extending horizontally outward therefrom. A swingable lever 80 is pivotally supported at its lower end in an ear 81 extending from the carriage and has a cam-like or weighted enlargement 82 thereon; its upper end lies against the pin 79 and both the lever 80 and the pin 79 lie in a common plane. A substantially upright bar 83 is pivotally supported in the end of the link 60 and its upper end engages and supports the cam 82. A stem 83b is pivotally mounted in the right-hand wall 24 (Fig. 2) and has rigid on its end a guide sleeve 83a through which the bar 83 extends slidably.

In the normal, inoperative condition of the machine, the switch 48 is open and the switch 78 is closed. Figs. 6 and 5, respectively, which show these switches in schematic form, are intended merely to illustrate examples of how such switches may be constructed or designed to function in the manner required of them, but of course any other types of switches which will function in the same or an equivalent manner may just as well be used. Switch 48 has two contact terminals 98 at the ends of contact bars between which a blade 100 is pivoted, the pivot thereof being the pin 51 (Fig. 2) to which the lever 50 is rigid. Fig. 6 shows this switch open; when the lever is kicked upward into the position shown in Fig. 4, the blade 100 bridges the gap between the bars, as shown in broken lines in Fig. 6.

Switch 78 comprises a housing or support 93 in which the pin 79 is axially slidable; a coiled tension spring 95 normally urges the pin outward, being anchored to the pin collar 94 and the housing 93 at 92. A contact arm 96 is carried by but insulated from the pin 79 and normally engages contact points 97 thereby closing the circuit between these points. Leads from these points to the terminals 101 are carried in series with leads 90 and 91, the former leading to one terminal of the switch 48 and latter to one terminal of the relay switch 85, mentioned below. A lead 98 connects the other terminal of the switch 48 with the power supply source. The wiring diagram is clearly shown in Fig. 1.

It is apparent that switch 78 is, as stated, normally closed, and that a very slight pressure against the pin 79 by the lever 80 will swing the latter to the right so as to push the pin 79 inward, thereby opening the circuit through the relay switch 85—86.

It is to be noted that the machine is restored to its inoperative condition shown in Fig. 1 upon release of all pressure upon the treadle 35.

The normal, inoperative condition of the machine is shown in Fig. 1, with the electrodes separated, the links 28–29 in folded condition, and the barrel 25 filled with oil because the piston 26 is at the top of the barrel. When work has been placed between the electrodes, the treadle 35 is depressed, and this initial depression of the treadle moves the roller 33 rearward until it reaches the limit stop floor elevation or ridge. In this initially depressed condition of the treadle, shown in Fig. 3, the rod 38 has been pushed to the right and has straightened out vertically the links 28–29, thereby raising the plate 23 and the cylinders carried thereon. The pressure of the spring 74 has simultaneously lifted the rod 21 so as to bring the welding points together against the work. However, the back pressure of the oil immediately causes the oil to start to flow from the barrel through the by-pass 72 into the cylinder 22, as the initial depression begins, and the valve stem and its associated and actuating parts are so arranged and designed as to cause the valve to close the by-pass, as shown in Fig. 3, just before completion of the said initial depression of the treadle. The treadle is then further depressed into the position shown in Fig. 4, whence the crank arm 34 is swung to the left to its limit stop 47, and the rod 54 is pulled upon (to the left) in an obvious manner. However, because of the closed oil system, this pull on the rod 54, which tends to push up the plunger 66, has no effect on the latter owing to the noncompressibility of the oil. If now, during the welding operation, for any reason whatever, the upper electrode descends below a predetermined level, or, in other words, if it make a deeper impression than that pre-set, the upper electrode descends slightly, thus reducing the downward pressure of the piston 26 on the oil in the barrel and hence permitting plunger 66 to move upward to a degree which is greater than the upward force on the piston in the ratio of the area of the barrel to the area of the plunger. Hence the plunger rises and pushes the switch lever 80 to the right to open the switch 78.

As shown in the wiring diagram, the toggle switch 48 and the switch 78 are both in series with a relay switch 85–86 and the power supply. The switch 86 is in turn in series with the primary of the transformer 87 through the medium of a manually controlled variable selector or tap 88, and the power supply; the secondary of the transformer is in series with the electrodes. It is therefore apparent that when the switch 78 is opened as above-mentioned, the welding current is shut off, thereby preventing deeper penetration of the upper electrode and limiting the depth of its impression on the work to that predetermined. The amount of pressure on the plunger 66 is regulated by the sleeve 53 in an obvious manner. Thus the current will be shut off every time the depth of the impression of the upper electrode will tend to exceed the predetermined amount.

It is thus apparent that a very fine control is had, assuring perfect welds regardless of voltage fluctuations, variations in resistance, or welding tip irregularities.

Obviously, modifications in form and structure may be made without departing from the spirit and scope of the invention.

I claim:

1. In a welding machine comprising a base and a support thereon, a substantially horizontal lever pivotally mounted on said support and extending therefrom, one end of said lever having a movable electrode thereon, a fixed electrode on said support, the other end of said lever having a rod pivotally suspended therefrom, a horizontal plate having a pair of spaced openings therethrough and having a barrel thereon surrounding said openings, a cylinder on said plate surrounding but spaced from said barrel thereby providing a chamber between said barrel and cylinder, the upper ends of said barrel and cylinder being closed except for coaxial openings therethrough, said rod passing through said coaxial openings and having a piston on the end thereof in said barrel, a bypass through said plate from said chamber to one of said plate openings providing communication between said chamber and said barrel and thereby providing a closed container including said barrel, said container having a quantity of fluid therein, said piston lying above said fluid in said barrel, a valve stem slidably mounted in said one of said plate openings, a plunger slidably mounted in said other of said plate openings, a wall extending downward from said plate, a pair of mutually pivoted links, one of said links being pivoted to said base, the other of said links being pivoted to said wall, a third link pivoted to said wall intermediate its length, a rod extending from said plunger and secured to said third link intermediate the length of the latter, a rod extending from said valve stem and secured to the free extremity of said other of said mutually pivoted links, said fluid normally lying within said barrel with said piston at the top of its stroke and with said mutually pivoted links in folded down condition, means for aligning said mutually pivoted links substantially vertically to raise said plate causing said fluid in said barrel to raise said piston thereby moving said movable electrode down and maintaining resilient pressure thereon, means for actuating said last-named means, means connecting said actuating means with said third-named link, said connecting means being resiliently telescopic, the upper end of said plunger terminating between the upper and lower ends of its said plate opening, a normally closed electric switch secured to said plate adjacent the end of said third-named link, said end of said third-named link having means thereon positioned adjacent said switch and adapted to open said switch upon pressure contact thereagainst, said switch forming part of the welding circuit of the machine, said electrodes being adapted to have a piece of work therebetween against which said resilient pressure of said movable electrode is applied, said movable electrode upon descent thereof into the work causing said lever to raise said piston to reduce the pressure in said barrel thereby causing said connecting means and said third-named link to move said plunger upward in its said opening thereby raising said end of said third-named link to bring said member thereof with pressure against said switch to open said circuit.

2. The device set forth in claim 1, said switch having adjustable means to vary the degree of said depression of said movable electrode required to cause said switch to open.

3. The device set forth in claim 1, said last-named two rods being flexible.

BERNARD STOUDT.

REFERENCES CITED

The following references are of record in the file of this patent:

UNITED STATES PATENTS

| Number | Name | Date |
|---|---|---|
| 1,043,637 | Smith | Nov. 5, 1912 |
| 1,848,905 | Rabeggaua | Mar. 8, 1932 |
| 1,967,094 | Lincoler | July 17, 1934 |
| 2,232,038 | Stone et al. | Feb. 18, 1941 |
| 2,283,826 | Soehuer | May 19, 1942 |
| 2,377,601 | Bayles | June 5, 1945 |